United States Patent
Mohanram et al.

(10) Patent No.: US 12,020,008 B2
(45) Date of Patent: Jun. 25, 2024

(54) EXTENSIBILITY RECOMMENDATION SYSTEM FOR CUSTOM CODE OBJECTS

(71) Applicant: Accenture Global Solutions Limited, Dublin (IE)

(72) Inventors: Jayanthi Mohanram, Bangalore (IN); Deepika Bhaskar, Bangalore (IN); Abhishek Sharma, Delhi (IN); Ravikumar Setty, Bengaluru (IN); Baljit Malhotra, Gurgaon (IN)

(73) Assignee: Accenture Global Solutions Limited, Dublin (IE)

( * ) Notice: Subject to any disclaimer, the term of this patent is extended or adjusted under 35 U.S.C. 154(b) by 121 days.

(21) Appl. No.: 17/683,860

(22) Filed: Mar. 1, 2022

(65) Prior Publication Data
US 2023/0280991 A1    Sep. 7, 2023

(51) Int. Cl.
*G06F 8/41* (2018.01)
*G06F 8/20* (2018.01)
*G06F 8/75* (2018.01)
*G06N 20/00* (2019.01)

(52) U.S. Cl.
CPC .............. *G06F 8/447* (2013.01); *G06F 8/24* (2013.01); *G06F 8/751* (2013.01); *G06N 20/00* (2019.01)

(58) Field of Classification Search
CPC ........... G06F 8/24; G06F 8/447; G06F 8/751; G06N 20/00; G06N 717/174–177; G06N 717/168–177
See application file for complete search history.

(56) References Cited

U.S. PATENT DOCUMENTS

| | | | | |
|---|---|---|---|---|
| 7,757,210 | B1 * | 7/2010 | Krueger | G06F 8/24 717/109 |
| 8,966,442 | B2 * | 2/2015 | Eska | G06F 8/751 717/120 |
| 10,990,370 | B1 * | 4/2021 | Bawcom | H04L 41/0895 |

(Continued)

OTHER PUBLICATIONS

Ceccato et al., "Adding Distribution to Existing Applications by means of Aspect Oriented Programming", published by IEEE, Proceedings of the Fourth IEEE International Workshop on Source Code Analysis and Manipulation (SCAM'04), pp. 1-10 (Year: 2004).*

*Primary Examiner* — S. Sough
*Assistant Examiner* — Zheng Wei
(74) *Attorney, Agent, or Firm* — Harrity & Harrity, LLP

(57) ABSTRACT

In some implementations, a device may receive extensibility data related to one or more custom code objects installed in a current environment. The device may classify the one or more custom code objects in one or more respective categories and determine one or more respective complexities associated with the one or more custom code objects based on the extensibility data. The device may generate an extensibility recommendation for deploying the one or more custom code objects to a target environment based on the one or more respective categories and the one or more respective complexities associated with the one or more custom code objects. The extensibility recommendation may be generated based on the one or more custom code objects satisfying extensibility conditions associated with the target environment. The device may provide an output relating to the extensibility recommendation.

20 Claims, 7 Drawing Sheets

(56) References Cited

U.S. PATENT DOCUMENTS

| | | | |
|---|---|---|---|
| 2005/0010919 A1* | 1/2005 | Ramanathan | G06F 8/61 |
| | | | 707/999.103 |
| 2011/0107327 A1* | 5/2011 | Barkie | G06F 8/63 |
| | | | 707/769 |
| 2011/0307869 A1* | 12/2011 | Cwalina | G06F 8/447 |
| | | | 717/127 |
| 2013/0339943 A1* | 12/2013 | Mallya | G06F 16/214 |
| | | | 717/176 |
| 2015/0019488 A1* | 1/2015 | Higginson | G06F 16/214 |
| | | | 707/634 |
| 2020/0264919 A1* | 8/2020 | Vukovic | G06N 20/00 |
| 2022/0092668 A1* | 3/2022 | Lu | G06N 5/04 |
| 2023/0079904 A1* | 3/2023 | Korlam | G06N 5/027 |
| | | | 717/137 |

* cited by examiner

EXTENSIBILITY RECOMMENDATION SYSTEM FOR CUSTOM CODE OBJECTS

BACKGROUND

In software engineering or systems design, some software systems may support development of custom code that can be used to add new capabilities or functionalities to the software system and/or modify existing capabilities or functionalities of the software system without impairing existing capabilities or functionalities. For example, a software system that supports custom code typically has an internal structure and dataflow that are minimally affected or unaffected by custom code that implements new or modified functionality (e.g., recompiling or changing original source code may be unnecessary when changing behavior associated with the software system). In software engineering, one design objective for custom code may be to achieve extensibility, which is used to decouple existing custom code objects from a core system (e.g., software stack) and move to a cloud-based platform (e.g., a business technology platform (BTP) and/or a hyperscaler platform) to promote decoupling from the core system. For example, using a decoupling approach and developing system-specific functionality on a cloud-based platform may remove and/or reduce dependencies on the core system. In this context, as described herein, extensibility may refer to techniques to develop custom solutions on a cloud-based platform and use application program interfaces (APIs) to support software decoupling.

SUMMARY

Some implementations described herein relate to a method. The method may include receiving, by a device, extensibility data related to one or more custom code objects installed in a current environment. The method may include classifying, by the device, the one or more custom code objects installed in the current environment in one or more respective categories based on the extensibility data associated with the one or more custom code objects. The method may include determining, by the device, one or more respective complexities associated with the one or more custom code objects installed in the current environment based on the extensibility data associated with the one or more custom code objects. The method may include generating, by the device, an extensibility recommendation for deploying the one or more custom code objects to a target environment based on the one or more respective categories and the one or more respective complexities associated with the one or more custom code objects, where the extensibility recommendation is generated based on a determination that the one or more custom code objects satisfy one or more extensibility conditions associated with the target environment. The method may include providing, by the device, an output that indicates the extensibility recommendation for deploying the one or more custom code objects to the target environment.

Some implementations described herein relate to a device. The device may include one or more memories and one or more processors coupled to the one or more memories. The one or more processors may be configured to deploy, to a current environment, a data extraction utility configured to scan one or more custom code objects installed in the current environment. The one or more processors may be configured to receive, from the data extraction utility, extensibility data related to the one or more custom code objects installed in the current environment. The one or more processors may be configured to determine one or more respective categories and one or more respective complexities associated with the one or more custom code objects installed in the current environment based on the extensibility data. The one or more processors may be configured to generate an extensibility recommendation for deploying the one or more custom code objects to a target environment based on the one or more respective categories and the one or more respective complexities associated with the one or more custom code objects. The one or more processors may be configured to provide an output that indicates the extensibility recommendation for deploying the one or more custom code objects to the target environment.

Some implementations described herein relate to a non-transitory computer-readable medium that stores a set of instructions for a device. The set of instructions, when executed by one or more processors of the device, may cause the device to receive extensibility data related to one or more custom code objects installed in a current environment. The set of instructions, when executed by one or more processors of the device, may cause the device to generate an extensibility recommendation for deploying the one or more custom code objects to a target environment based on one or more respective categories and one or more respective complexities that are associated with the one or more custom code objects based on the extensibility data. The set of instructions, when executed by one or more processors of the device, may cause the device to provide an output that indicates the extensibility recommendation for deploying the one or more custom code objects to the target environment based on the one or more custom code objects satisfying one or more extensibility conditions associated with the target environment.

DETAILED DESCRIPTION

Figure 1A:
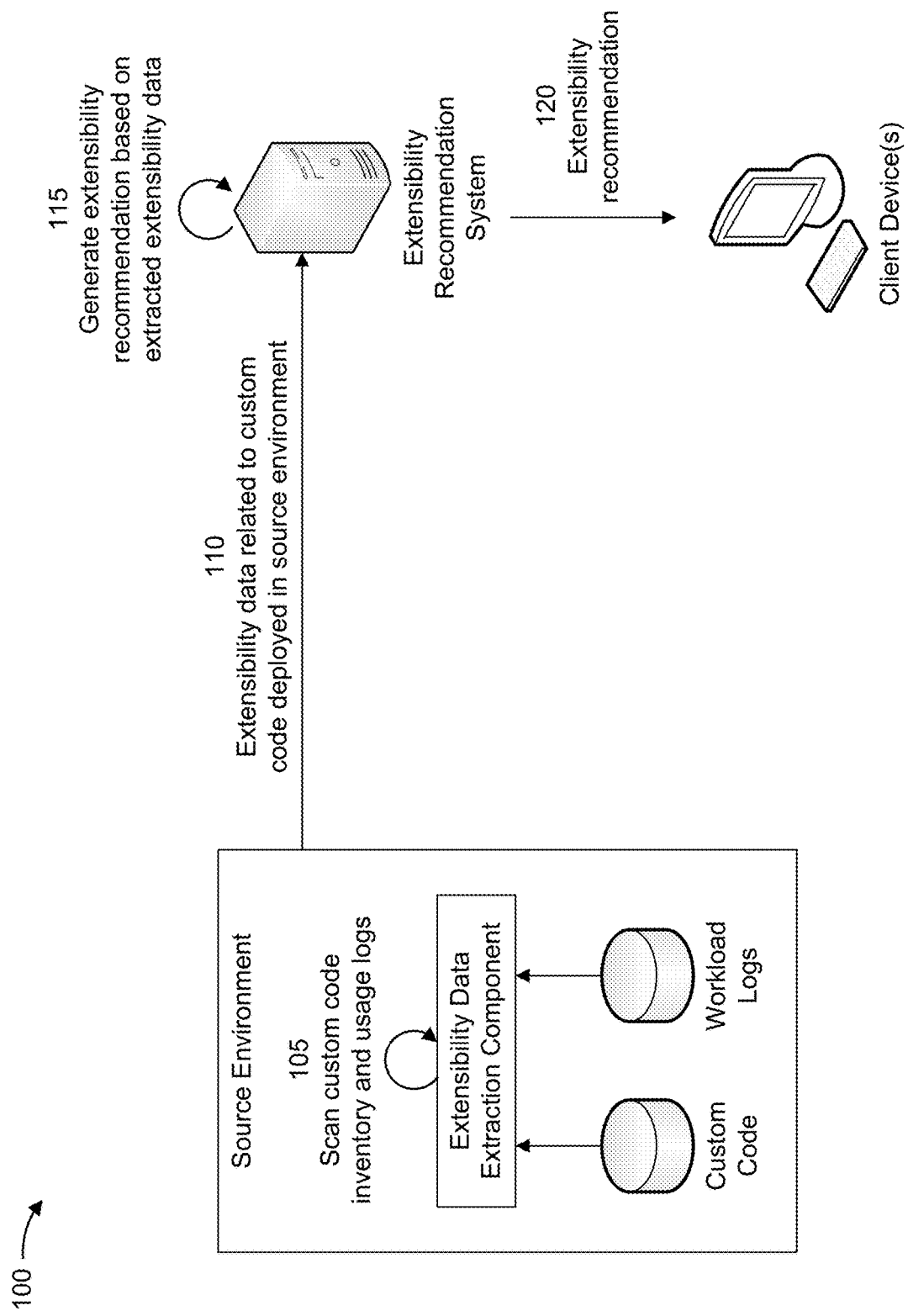
FIGS. 1A-1C are diagrams of an example implementation of an extensibility recommendation system for custom code objects, as described herein.

The following detailed description of example implementations refers to the accompanying drawings. The same reference numbers in different drawings may identify the same or similar elements.

As described above, some software systems may include features to integrate custom code objects that are developed to add new capabilities or functionalities and/or modify existing capabilities or functionalities to the software system without impairing existing capabilities or functionalities. Accordingly, because software systems often have a long lifecycle and may need to be modified to include new features and/or functionalities that are demanded by users, using custom code enables developers to expand or add to the capabilities of a software system to meet user demands, facilitate systematic reuse, and/or otherwise fulfill specific requirements or provide features that are not to be included in a standard (e.g., off-the-shelf) version of the software system. However, custom code can pose various challenges when there is a need to convert the custom code for a new software system (e.g., because the new software system offers advantages over the current software system, such as improved performance, faster deployment, simpler upgrades, a cleaner core, and/or agility innovations, among other examples).

For example, because organizations often expend significant efforts to develop, deploy, and maintain custom code to satisfy specific organizational needs or requirements, organizations may desire to maximize opportunities and/or options to decouple custom code objects from an existing software system and reuse custom code objects in a new (target) software system and/or to inform decision-making regarding whether to decouple custom code objects and move to the new software system. For example, in order to convert or otherwise transform custom code objects for a new software platform, a development team may need to assess the current software system to decide which custom code objects need to be moved to the new software platform, and any custom code objects (e.g., modules, functions, and/or sub-routines) need to be assessed to determine what is required and how custom code is to be moved to the new software platform. Like any advanced computer programming project, successful code extensibility, which may generally refer to techniques to develop custom solutions on a cloud-based platform (e.g., a business technology platform (BTP) and/or a hyperscaler platform) and use application program interfaces (APIs) to support software decoupling, requires proper planning and documentation to thoroughly assess the reusability of custom code objects and develop a strategy to move the custom code objects that is consistent with a design of the new platform, all of which needs to be done within a limited time and with minimal risk and maximum flexibility.

Some implementations described herein relate to an extensibility recommendation system that may assess custom code objects that are installed in a source environment and provide best fit recommendations regarding which custom code objects can be moved to a target environment to support digital decoupling between the custom code objects and the underlying software system. For example, some implementations are described in a context where the source environment is a first version of a software system (e.g., an on-premise software system that is hosted on the premises of an organization and managed by the organization) and the target environment is a new version of the software system (e.g., a cloud-based software platform) that significantly redesigns the first version. More generally, as described herein, the extensibility recommendation system may assess whether one or more custom code objects that are deployed in a first software system can be suitably deployed to a second software system and provide various recommendations regarding which custom code objects are extensibility candidates, what extension type should be used to deploy the custom code objects to the target environment, an estimated effort to decouple the custom code objects from the source environment and reuse or reimplement the custom code objects for the target environment, and/or a strategy for carrying out the extensibility of the custom code objects. In this way, some implementations described herein may provide organizations with a capability to assess and understand the custom code objects that are deployed in the current (source) environment and gain insights into how the custom code objects can be managed in the target environment, simplify and streamline processes to enable digital decoupling and migrate to the target environment, and/or ensure that relevant requirements of the target environment are satisfied (e.g., by using an extension type that maintains a clean core), among other examples.

Figure 1B:
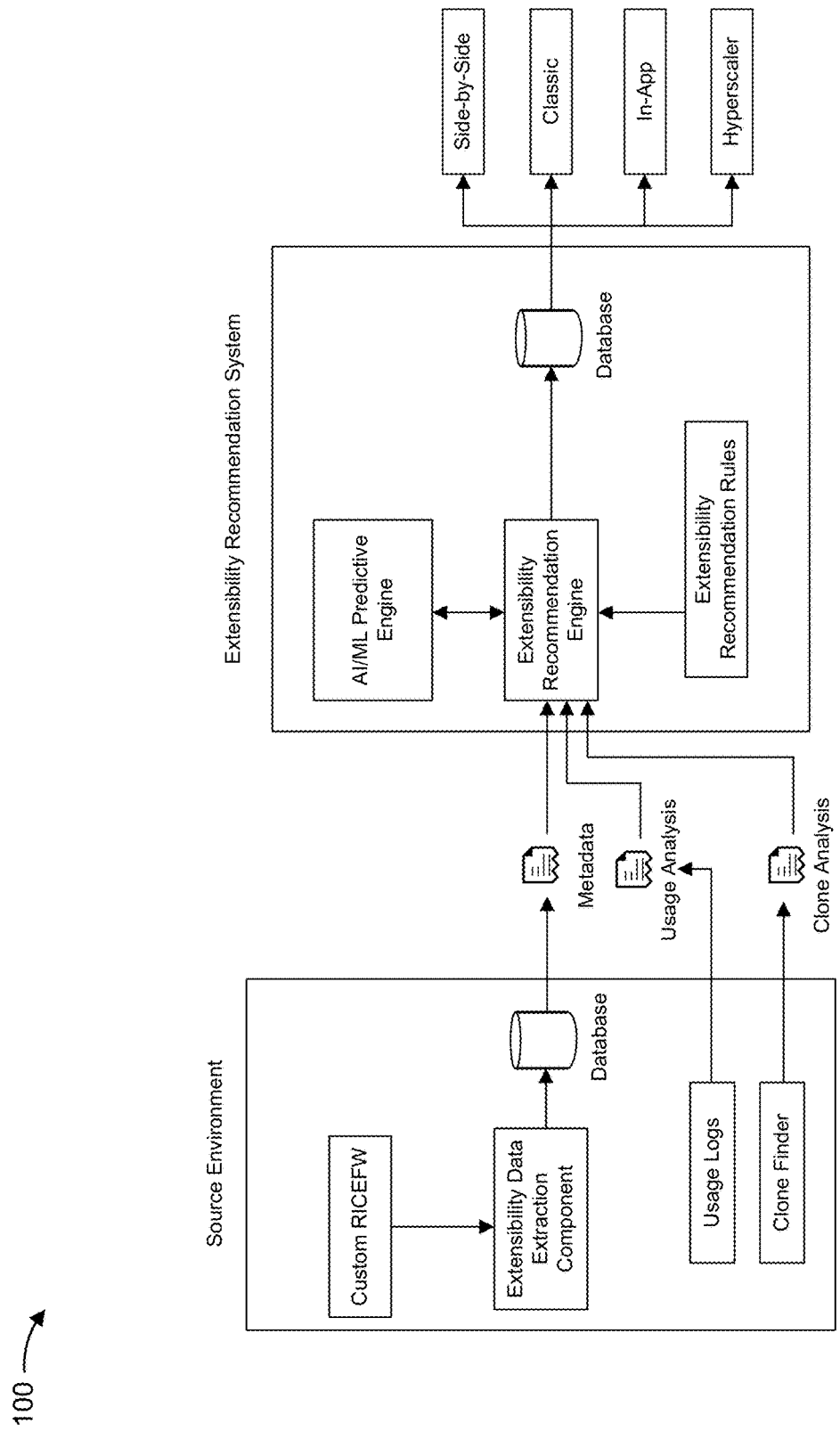
Figure 1C:
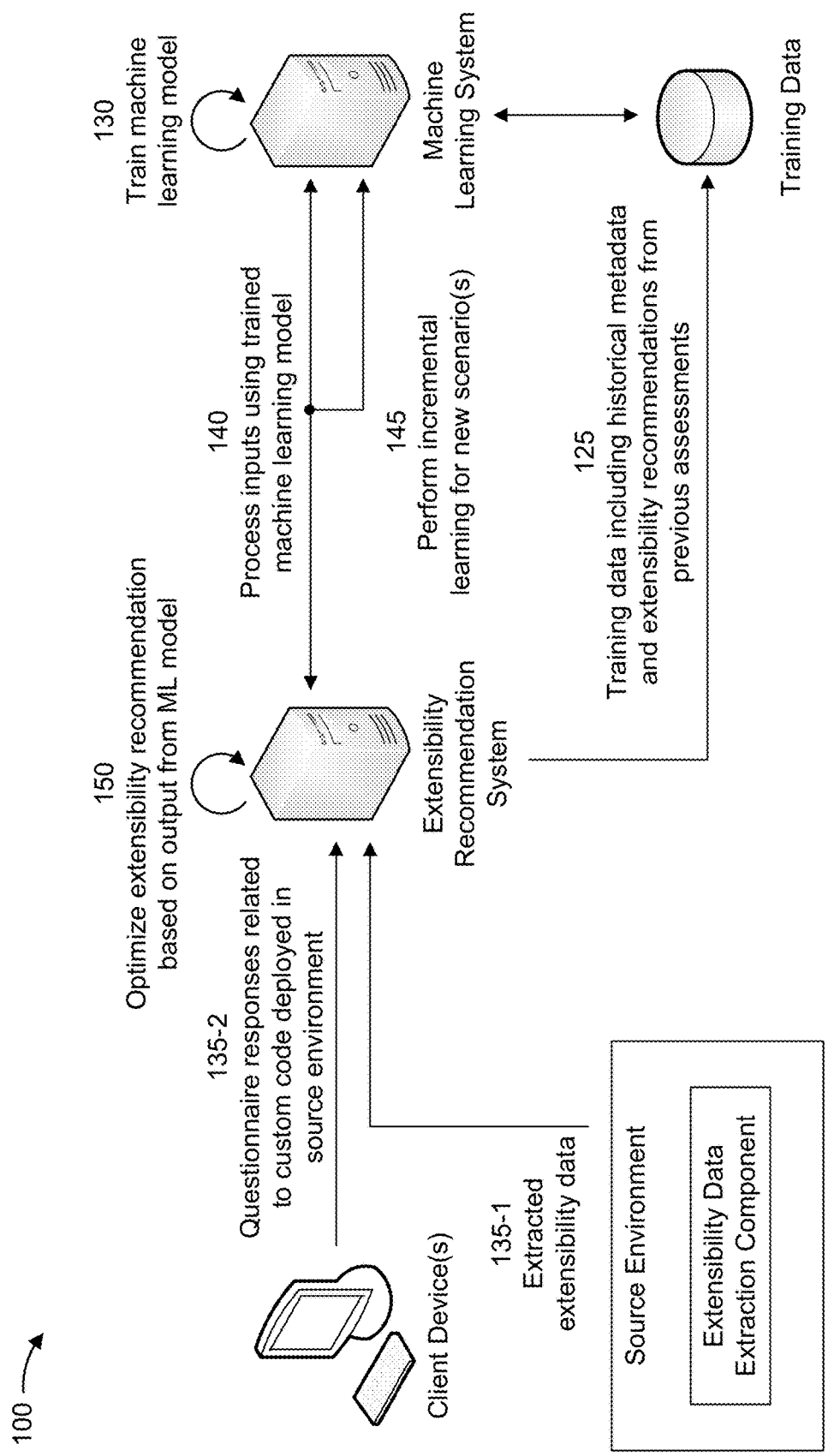

FIGS. 1A-1C are diagrams of an example implementation 100 associated with extensibility recommendations for custom code objects. As shown in FIGS. 1A-1C, example implementation 100 includes an extensibility recommendation system, a client device, and a source production environment. The extensibility recommendation system, client device, and source production environment devices are described in more detail below in connection with FIG. 3 and FIG. 4.

As shown in FIG. 1A, and by reference number 105, an extensibility data extraction component may be installed in the source environment in a sandbox or a near-production version of the source environment (e.g., a latest or most recent copy of the production version of the source environment). Accordingly, in some implementations, the extensibility data extraction component may scan a custom code inventory in the sandbox or near-production version of the source environment and may obtain usage logs from the production version of the source environment to extract relevant data (referred to herein as "extensibility data") to assess whether and/or how to extend the custom code objects for a target environment. For example, as described in further detail herein, the extensibility data extraction component may be a data extraction utility that is associated with the extensibility recommendation system and deployed to the source environment to obtain the extensibility data that may be needed to perform a custom code assessment and select best fit extensibility options for migrating custom code objects to a target environment. In general, as described herein, the extensibility data extraction component may be installed in a sandbox environment or a latest copy of a production environment to avoid exposing data in a live (production) environment to a third-party. For example, as described herein, the extensibility data extraction component may generally scan the custom code objects in the sandbox or near-production version of the source environment to extract metadata or other suitable information related to the current customizations that are implemented in the source environment, which may then be provided to the extensibility recommendation system to generate recommendations related to various extensibility options to support decoupling the custom code objects from the source environment and developing extensions that will run the custom code objects on the target (e.g., cloud-based) environment.

For example, as described in further detail herein, the extensibility data extracted from the source environment may include an inventory listing the custom code objects deployed in the source environment, usability of the custom code objects, complexities of the custom code objects, functionalities of the custom code objects, and/or dependencies on the core of the underlying software system, among other examples. In this way, the extensibility data related to the custom code objects deployed in the source environment can be used to identify one or more options or recommendations for moving the custom code objects to the target environment or rebuilding the custom code objects for the target environment. For example, reusability of custom code objects may be heavily dependent on the quality and nature of the custom code, whereby the extensibility data may provide the extensibility recommendation system with information to assess the quality and nature of the custom code to determine the best options or recommendations for moving, rebuilding, or rewriting the custom code objects (e.g., a loosely coupled add-on with a clear interface to standard objects associated with the underlying software system may have a high code reuse, whereas freestyle custom code interwoven with standard objects might need a complete rewrite).

Accordingly, as shown in FIG. 1B, the extensibility data extraction component may scan custom code objects developed for the source environment to obtain metadata that can be used to classify the custom code objects into one or more categories (e.g., reports, interfaces, conversions, enhancements, flows, or workflows (RICEFW)), which the extensibility recommendation system may use together with other relevant information (e.g., usage analytics obtained from the production version of the source environment and/or clone analytics obtained by a clone finder component, described in more detail below) to provide custom code extensibility recommendations based on the target environment move. For example, as shown in FIG. 1B, the extensibility recommendation system may receive the RICEFW metadata, usage analytics, and clone analytics, and may apply one or more extensibility recommendation rules to provide a recommended extension type (e.g., side-by-side (or cloud) extension, in-app extension, classic extension, or hyperscaler extension, among other examples) and/or recommendations regarding underlying technologies and/or tools to be used to implement the recommended extension type. Furthermore, as shown in FIG. 1B and described in more detail below with reference to FIG. 1C, the extensibility recommendation system may use an artificial intelligence (AI) or machine learning (ML) system (shown as an AI/ML, predictive engine in FIG. 1B) to provide more accurate extensibility recommendations and/or enable an organization to obtain extensibility recommendations for custom code objects without having to deploy the extensibility data extraction component to the source environment.

In some implementations, in order to extract the extensibility data from the source production environment, the extensibility data extraction component may be deployed to the source environment. For example, a user of the client device may submit a request to the extensibility recommendation engine to request a custom code extensibility assessment and input a set of parameters to enable the custom code extensibility assessment. In this way, as described herein, the extensibility recommendation engine may help an organization that is operating the source environment to develop an approach and solution to decouple custom code objects from the source environment and transform the custom code object(s) for the target environment (e.g., a cloud-based BTP, a hyperscaler platform, and/or another suitable target environment). For example, the user of the client device may input a client identifier, a project identifier, an identifier or description of the source environment, an identifier or description of the target environment, an indication of whether a cloud-based platform is in-scope within the target environment, an identifier of a cloud service provider (e.g., if the cloud-based platform is in-scope), a gateway architecture, and/or one or more modules associated with a software platform that are enabled in the source environment and/or the target environment. In some implementations, based on one or more parameters input by the user of the client device (e.g., a database identifier, a host name, an installation number, and/or a system identifier or client identifier), the extensibility recommendation system may prepare an encrypted code file that may then be downloaded to and installed in the source environment. For example, the extensibility recommendation system may prepare a transport request specifically for the source environment to be assessed, where the source environment may use the transport request to import the encrypted code file that contains the installer for the extensibility data extraction component. Furthermore, the transport request may be used to import data dictionary (DDIC) objects that contain metadata about the underlying software system used in the source environment (e.g., RICEFW keywords used for RICEFW classification). Accordingly, the encrypted code file may be used to install the extensibility data extraction component in the source environment to be assessed at runtime when a production state of the source production environment has been recently refreshed. Additionally, or alternatively, the encrypted code file may install the extensibility data extraction component in a sandbox environment where the extensibility data extraction component can be safely run in isolation separate from the production version of the source environment.

In some implementations, after the extensibility data extraction component has been installed in the source environment, a set of tokens or keywords (e.g., custom RICEFW identifiers or keywords) may be imported into the source environment (e.g., based on a tab-delimited file included in the installer for the extensibility data extraction component). Accordingly, the set of tokens or keywords may enable the extensibility data extraction component to scan the custom code objects in the source environment to support classification of the custom code objects by the extensibility recommendation system. For example, as described herein, the extensibility data extraction component may include a custom code scanning microservice that may scan a code base in one or more namespaces associated with the source environment to identify the custom code objects to be assessed (e.g., classified within RICEFW categories and/or analyzed to determine a complexity, among other examples). In some implementations, the extensibility data extraction component may execute the custom code scanning microservice to scan the complete code of the objects in the code base using predefined token collectors (e.g., based on the DDIC objects that contain metadata about the underlying software system, such as advanced business application programming (ABAP) statements that are used in the custom code objects).

In some implementations, the extensibility data extraction component may further include an extensibility schema collection microservice that may collect metadata associated with the custom code objects installed in the source environment. In some implementations, the extensibility schema collection microservice may prepare a metadata file that includes various metadata fields for each custom code object that is scanned in the source environment, where the metadata file can then be used by the extensibility recommendation engine to generate one or more extensibility recommendations for the custom code objects. For example, as described herein, the extensibility schema collection microservice may be configured to capture metadata details that enable classification of the custom code objects (e.g., within the RICEFW categories) and/or otherwise determining the extensibility of the custom code objects. For example, the metadata captured by the extensibility schema collection microservice may include a quantity of create, read, update, delete (CRUD) operations, a quantity of standard and/or custom function modules, a quantity of standard and/or custom database tables, a quantity of remote function calls (RFCs), a quantity of drilldown operations (e.g., call transactions or submit programs), a quantity of ABAP list viewer (ALV) calls, and/or other suitable information associated with the scanned custom code objects.

In some implementations, in addition to scanning the custom code objects to obtain the metadata that may enable classification, complexity determination, and/or extensibility determination for the custom code objects, the extensibility data extraction component may extract usage analysis logs from a production version of the source environment to obtain metrics that relate to a frequency of execution for each custom code object and standard transaction codes (TCodes) that are used by the custom code objects. For example, the standard TCodes may be used whenever a standard task associated with the underlying software system is executed, whereby the standard TCodes used in the custom code objects may be mapped to corresponding standard applications associated with the underlying software system to obtain the usage metrics for the custom code objects. Furthermore, in some implementations, the extensibility data extraction component may execute an ABAP utility program on the entire inventory of custom code objects to obtain a list of the custom code objects that are cloned from standard objects associated with the underlying software system (e.g., cloned objects may be user-created artifacts that are copies of or otherwise substantially identical to standard objects associated with the underlying software system, which may be a strong indicator of the extensibility of the cloned objects).

As further shown in FIG. 1A, and by reference number 110, the extensibility data extracted from the source environment by the extensibility data extraction component may be provided to the extensibility recommendation system. For example, in some implementations, the extensibility data provided to the extensibility recommendation system may generally include metadata related to the custom code objects that were scanned in the sandbox or near-production version of the source environment, the usage data associated with the custom code objects (e.g., a frequency and volume for each custom code object, which is obtained from the production version of the source environment), and clone analytics associated with the custom code objects (e.g., an object name and a percentage or other metric related to a degree to which the custom code object is a copy of a standard object).

In some implementations, the metadata related to the custom code objects may be encapsulated within a file or another suitable data structure that can be downloaded and imported into the extensibility recommendation system. For example, for each custom code object, the metadata provided to the extensibility recommendation system may include metadata fields to describe an object name (e.g., the name of the custom code object), an object description (e.g., a title of the custom code object), and an object type (e.g., which may have values to describe one or more constructs associated with the custom code object, such as PROG, BADI, ENHO, ENHS, Exit, USRE, USRR, SSFO, SFPI, INCL, or Module Pool in an SAP-based software system). Furthermore, in some implementations, the metadata for a custom code object may include metadata fields to describe one or more RICEFW parameters (e.g., parts of the custom code that match tokens or keywords associated with report, interface, conversion, enhancement, form, and/or workflow categories), one or more complexity parameters (e.g., whether the custom code objects include RFC function module calls, use database tables, or perform select queries on a database table, a drill-down level of the custom code objects, and/or other parameters related to a complexity of the custom code objects). Furthermore, in some implementations, the metadata for a custom code object may include metadata fields to describe one or more extensibility parameters (e.g., a function module metadata field may indicate whether the custom code objects use function modules, a native interface metadata field may indicate whether the custom code objects use native structured query language (SQL), an update metadata field may indicate update operations that the custom code objects perform on database tables, and/or a modify metadata field may indicate modify operations that the custom code objects perform on database tables, among other examples).

As further shown in FIG. 1A, and by reference number 115, the extensibility recommendation system may generate an extensibility recommendation for the one or more custom code objects installed in the source environment based on the extensibility data extracted by the extensibility data extraction component. For example, as described herein, the extensibility recommendation system may include various integrated microservices to generate the extensibility recommendation, where the integrated microservices may include a custom code classification microservice to classify the custom code objects in the namespace(s) associated with the source environment into different categories (e.g., RICEFW categories), a complexity determination microservice to determine a complexity of the custom code objects, a recommendation service to indicate an extensibility type for a custom code object (e.g., side-by-side extension, in-app extension, classic extension, hyperscaler extension, or another suitable extension type), a feasibility microservice to check that the custom code objects satisfy one or more fitment (e.g., compatibility) requirements of standard applications or standard objects running in the target environment, and/or an effort estimation microservice to provide an estimated effort to develop the custom code objects according to the recommendation.

Accordingly, in some implementations, the extensibility recommendation system may be configured as a multi-layer microservices architecture that can generate the extensibility recommendations for the custom code objects based on the extensibility data provided by the extensibility data extraction component. For example, as described herein, the extensibility data may include metadata fields related to RICEFW category-specific tokens associated with the custom code objects, metadata fields that include parameters related to a complexity of the custom code objects, and/or metadata fields that include parameters related to an extensibility of the custom code objects. Furthermore, in some implementations, the extensibility data provided by the extensibility data extraction component may include the usage analytics related to the frequency and/or volume of use for each custom code object and/or clone analytics that indicate whether and/or to what extent a custom code object is cloned or otherwise copied from a standard object associated with the underlying software system. In some implementations, the extensibility recommendation system may receive the extensibility data from the extensibility data extraction component, and may process the extensibility data using various rules configured in the multi-layer microservices architecture (e.g., classification rules, complexity factor rules, extensibility recommendation rules, and/or other suitable rules) to generate the extensibility recommendations for the custom code objects installed in the source environment.

For example, in some implementations, the extensibility recommendation system may process the extensibility data using a set of classification rules in order to classify the custom objects within one or more RICEFW categories (e.g., reports, interfaces, conversions, enhancements, forms, or workflows). For example, the extensibility data extraction component may scan the custom code objects installed in the source environment for predefined tokens associated with the different RICEFW categories to extract schema data and/or other suitable metadata based on the functionality of the custom code objects to be classified. Accordingly, the extensibility recommendation system may apply the classification rules to the extracted schema data and/or other metadata in order to classify the custom code objects within one or more RICEFW categories and/or RICEFW subcategories. For example, if the extensibility data for a custom code object indicates that the custom code object does not perform any CRUD operations and has one or more keywords or tokens that relate to displaying a report output, the custom code object may be classified within the report category and may be further sub-classified as an analytical report, a transactional report, an interactive report, and/or another suitable report sub-category depending on the tokens that are scanned in the custom code object. In another example, if the extensibility data for a custom code object indicates that the custom code object performs a batch data communication (BDC) operation or a business application programming interface (BAPI) operation, the custom code object may be classified within the conversions category and may be further sub-classified as a BDC conversion or a BAPI conversion depending on the tokens that are scanned in the custom code object. In this way, the extensibility recommendation system may use the classification rules to classify each custom code object into one or more RICEFW categories and/or sub-categories, which may be used alone or in combination with other suitable information to generate the extensibility recommendation for each custom code object.

In some implementations, the extensibility recommendation system may process the extensibility data provided by the extensibility data extraction component using a set of complexity rules in order to determine the complexity associated with each custom code object (e.g., the complexity for a given custom code object may be determined to be simple, medium, high, or otherwise defined at another suitable granularity). For example, the complexity rules may define one or more complexity parameters that may be indicative of a simple (or low) complexity, medium or moderate complexity, high complexity, or other suitable complexity, and may determine the complexity of each custom code object based on the one or more complexity parameters. Additionally, or alternatively, the extensibility recommendation system may determine the complexity of a custom code object based on an extent to which the custom code object includes custom artifacts (e.g., tables, functions, modules, and/or RFC calls, among other examples) and/or a customization level associated with the custom code object based on the extensibility data provided by the extensibility data extraction component that runs in the source production environment. Furthermore, in some implementations, the complexity rules may vary among different RICEFW categories. For example, the complexity rules may indicate that a custom code object classified as a report has a simple complexity based on the custom code object providing a single-level report and/or low-complexity data retrieval, a medium complexity based on the report providing a multi-level report with significant complexity data retrieval, or a high complexity if the complexity rules do not satisfy the conditions for simple or medium complexity and/or the custom code object includes one or more parameters that satisfy conditions that are defined for high complexity reports. In this way, the extensibility recommendation system may use the complexity rules to determine the complexity of each custom code object, which may be used alone or in combination with other suitable information to generate the extensibility recommendation for each custom code object.

In some implementations, as described herein, the extensibility recommendation system may apply one or more extensibility rules to determine an extension type that may be used to decouple one or more custom code objects from the source environment, deploy one or more custom code objects within the target environment, and/or enable reuse of one or more custom code objects in the target environment. For example, in some implementations, the target environment may support extensions (e.g., custom code objects) that have different types, such as a side-by-side extension type (or cloud-based extension type) that can be used to integrate custom code objects that extend the functionality of the underlying software system in the target environment by deploying the custom code objects through one or more application program interfaces (APIs), services, applications, events, or development platforms (e.g., a side-by-side extension may be built and deployed alongside a core software stack used in the target environment). In another example, an in-app extension type may allow custom code objects to be built in the same system or software stack of the source environment (e.g., to add or delete custom fields and/or customize a user interface, among other examples). In another example, the extensible target system may support a classic extension type, where custom code objects remain in the source environment. In another example, the extensible target system may support a hyperscaler extension type, where custom code objects can run in a target environment that can be hyperscaled to modify (e.g., increase or decrease) allocated compute, memory, networking, and/or storage resources based on fluctuations in demand.

Accordingly, in some implementations, the extensibility recommendation system may process the extensibility data provided by the extensibility data extraction component using the extensibility rules, which may include parameters that are based on the target environment, to determine whether to recommend using the side-by-side, in-app, classic, hyperscaler, or other extension type for the custom code objects. For example, the extensibility recommendation system may recommend using a side-by-side extension type to deploy a custom code object in the target environment based on the custom code object satisfying any applicable conditions or constraints for the side-by-side extension type. Alternatively, if the custom code object fails to satisfy one or more conditions or constraints for the side-by-side extension type, the extensibility recommendation system may validate whether the custom code object satisfies conditions or constraints for the in-app extension type. In such cases, the extensibility recommendation system may determine that the in-app extension type is to be used based on the custom code object satisfying the conditions or constraints for the in-app extension type. Alternatively, the extensibility recommendation system may determine that the classic extension type is to be used to deploy the custom code object based on the custom code object failing to satisfy the conditions or constraints for the side-by-side or in-app extension types. Alternatively, in some implementations, the extensibility recommendation system may indicate whether manual intervention is needed to classify a custom code object (e.g., because the extensibility recommendation system was unable to automatically classify the extension type).

As further shown in FIG. 1A, and by reference number 120, the extensibility recommendation system may provide, to the client device, the extensibility recommendation that was generated for each custom code object that satisfies one or more extensibility conditions. For example, in some implementations, the extensibility recommendation system may provide a web application (e.g., a Java 2 Platform, Enterprise Edition (J2EE) and/or HTML5 based application) or another suitable interface to allow the client device to access the extensibility recommendation for each custom code object installed in the source environment, which may include at least a recommended extension type (e.g., side-by-side, in-app, classic, or hyperscaler). Furthermore, in some implementations, the extensibility recommendation for one or more custom code objects may include additional information to assist a development team with decoupling the custom code object from the source environment and/or reusing the custom code object in the target environment and/or to inform decision-making regarding whether and/or how to enable reuse of the custom code object in the target environment.

For example, in some implementations, the additional information provided by the extensibility recommendation system may include a recommended solution approach for enabling extensibility for a custom code object, which may be based on the extensibility recommendation for the custom code object, the architecture and/or software design of the source environment and the target environment, the reusability of the custom code object, and/or the availability of a reusable API, among other examples. For example, to enable extensibility for a custom code object using the in-app extension type, one or more in-app extensibility tools may be available to implement the extension in a software stack of the source environment. Accordingly, in some implementations, for a custom code object associated with an in-app extension type recommendation, the extensibility recommendation system may recommend using an in-app tool to enable user interface adaptation based on the custom code object defining layout changes, may recommend using an in-app tool to define custom fields and logic based on the custom code object defining field-level changes, or may recommend using an in-app tool to configure a custom business object based on the custom code object being categorized as a simple custom application, among other examples.

Additionally, or alternatively, for a custom code object associated with a recommendation for a side-by-side (or cloud-based) extension type, the recommended solution approach may be based on one or more cloud services that are available in the target environment, which may depend on a cloud service provider associated with the target environment. Furthermore, in some implementations, the recommended solution approach for enabling extensibility for the custom code object using the side-by-side extension type may be based on a reusability factor associated with the custom code object. For example, if the cloud services available in the target environment (e.g., services provided by the cloud service provider) include services to re-platform an existing ABAP program, the recommended solution approach may be to use an ABAP Platform as a Service (PaaS) technique that enables running ABAP code in a cloud-based platform using a managed implementation or an unmanaged implementation (e.g., based on a feasibility fitment of whitelisted APIs). Alternatively, if the cloud services available in the target environment do not enable re-platforming an existing ABAP program, the custom code object may be implemented using a cloud application programming (CAP) model, such as Node.JS or Java Service, among other examples.

In some implementations, the additional information that the extensibility recommendation system provides for enabling extensibility for a custom code object may include an effort estimation, which may be determined based on rules that relate to software development best practices, the extensibility recommendation for the custom code object, the architecture and/or software design of the source environment and the target environment, the classification and/or complexity of the custom code object, the reusability of the custom code object, the availability of a reusable API, and/or the recommended solution approach for enabling extensibility for the custom code object, among other examples. For example, the extensibility recommendation system may output an indication of whether the estimated effort to enable extensibility for a custom code object is low, medium, or high based on one or more of the factors described above, which may be determined in an automated manner and/or in an automated manner in combination with input from a subject matter expert (SME). Additionally, or alternatively, in some implementations, the additional information related to enabling extensibility for a custom code object may include a standard application fitment (e.g., based on a mapping between standard transactions that are recorded in the usage data and standard applications that are available in the target environment) and/or a feasibility of standardization (e.g., based on the availability of standard functionality in the target environment for the existing functionality provided by the custom code objects in the source environment).

In some implementations, in addition to supporting a rules-based approach to generate extensibility recommendations for custom code objects based on extensibility data that the extensibility data extraction component extracts from the source environment, the extensibility recommendation system may include or may use a machine learning system to enable various other use cases. For example, as shown in FIG. 1C, and by reference number 125, the extensibility recommendation system may store, in a suitable data repository, training data that includes historical metadata and extensibility recommendations (and any related information) from previous extensibility assessments that are run in different source environments where the extensibility data extraction component has been installed to extract extensibility data. Accordingly, as shown by reference number 130, the training data may be used to train one or more machine learning models to support various other use cases for the extensibility recommendation system. For example, in some implementations, the one or more machine learning models may be trained using a supervised learning algorithm that uses labeled datasets (e.g., the training data created by the extensibility recommendation system) to train the one or more machine learning models to classify new observations and predict outcomes. For example, as described below in connection with FIG. 2, the machine learning model(s) may learn different hidden patterns in the training data created by the extensibility recommendation system, and may then attempt to apply the knowledge gained from the training data to make predictions for unseen data (e.g., extensibility data extracted from another source environment).

In general, supervised learning algorithms may include regression techniques that aim to reproduce output values, which are best suited to make predictions related to continuous variables, and classification techniques that are designed to predict categorical class labels for new observations based on past observations (e.g., the historical training data). In this regard, the goal of classification techniques is to identify which class or category the new data will fall into. For example, in one use case, the machine learning model(s) may be trained using a classification technique to classify an extensibility type associated with a custom code object (e.g., side-by-side, in-app, classic, or hyperscaler extensibility). Additionally, or alternatively, the machine learning model(s) may be trained to determine a category (e.g., a RICEFW category) and/or a complexity of a custom code object and/or an estimated effort to enable extensibility for a custom code object, among other examples. In some implementations, the one or more machine learning models may be trained using a random forest classification technique, which is a supervised machine learning technique in which random forests create decision trees on randomly selected data samples, a prediction is obtained from each tree, and a best solution for classification is selected using a voting scheme. However, although a random forest classification technique is described herein, it will be appreciated that other suitable classification algorithms may be used (e.g., stochastic gradient descent, gradient boosting, K-nearest neighbors, and/or support vector machines).

In some implementations, in a first stage of the random forest classification technique, the machine learning system may randomly select k features out of m total features and may build the random forest from the k randomly selected features, where k<m. For example, among the k features, the machine learning system may calculate a node d using a best split point, split the node d into one or more daughter nodes using the best split point, and repeat these steps until a desired quantity of nodes have been reached. The machine learning system may then build the forest by repeating the previous steps n times to create n trees. In a second stage, the machine learning system may use the trained random forest algorithm to make predictions. For example, test features and rules of each randomly created decision tree may be used to predict an outcome based on the test features, votes for each predicted target may then be calculated, and the predicted target with the highest number of votes may be taken as the final prediction from the random forest algorithm. In this way, the random forest algorithm may be well-suited to training the machine learning model(s) used in connection with the extensibility recommendation system because the random forest algorithm is an accurate and robust method due to the quantity of decision trees participating in the process, reduces overfitting in decision trees and helps to improve accuracy, provides relative feature importance (e.g., based on different vote tallies) to help select the most contributing features for the classifier, offers stability because a new data point may impact one or more trees but is unlikely to impact many or all the trees, and/or can tolerate missing values and/or noise, among other examples.

In some implementations, as described herein, the extensibility recommendation system may use the trained machine learning model(s) to improve the flexibility and/or accuracy of the extensibility recommendations provided by the extensibility recommendation system in various scenarios. For example, in a scenario where the extensibility data extraction component can be suitably installed in a source environment, the extensibility data extraction component may extract extensibility data from the source environment and provide the extensibility data to the extensibility recommendation system, as shown by reference number 135-1. In this scenario, the extensibility recommendation system may autonomously generate extensibility recommendations for one or more custom code objects running in the source environment using a rules-based approach (e.g., without assistance from the machine learning system or machine learning models, as described above in connection with FIG. 1A). In some implementations, as shown by reference number 140, the extensibility recommendation system may provide the extensibility data to the machine learning system, which may use the trained machine learning models to make predictions related to classifying the custom code objects, determining the complexities of the custom code objects, and/or determining a best extension type for the custom code objects. In this scenario, as shown by reference number 145, the machine learning system may perform an incremental learning process if the extensibility data includes a new scenario that is not accounted for in the training data. For example, the recommendations, classifications, complexities, and/or other data labels may be fed back to the trained machine learning models to improve prediction accuracy and/or avoid a need for manual verification. Furthermore, as shown by reference number 150, the extensibility recommendation system may optimize an extensibility recommendation for one or more custom code objects based on an output from the machine learning system. For example, the classifications, complexities, and/or extensibility recommendations that are produced using the rules-based approach may be enriched with any additional data included in the output from the machine learning system and/or otherwise optimized in cases where there is a mismatch in the outputs of the rules-based approach and the machine learning models.

Additionally, or alternatively, as shown by reference number 135-2, the machine learning system may enable the extensibility recommendation system to generate extensibility recommendations in cases where the extensibility data extraction component cannot be installed in a source environment (e.g., due to information security concerns or any other reason). In this case, a questionnaire may be presented to a client device to solicit information related to important details associated with the custom code objects to be assessed for extensibility purposes. For example, the questionnaire may request information such as a name, one or more RICEFW categories, a complexity, a quantity of custom tables, a quantity of standard tables, a quantity of drill operations, a quantity of select queries, and/or any other suitable information associated with a custom code object to be assessed. In this case, as shown by reference number 140, the responses to the questionnaire may be provided to the machine learning system, which may use the trained machine learning model(s) to classify the custom code objects, determine the complexity of the custom code objects, recommend an extensibility type for the custom code objects, and/or generate any other information related to extensibility of the custom code objects based on the questionnaire responses. Furthermore, in a similar manner as described above, information associated with new scenarios may be used in an incremental learning process to improve the accuracy of future predictions.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
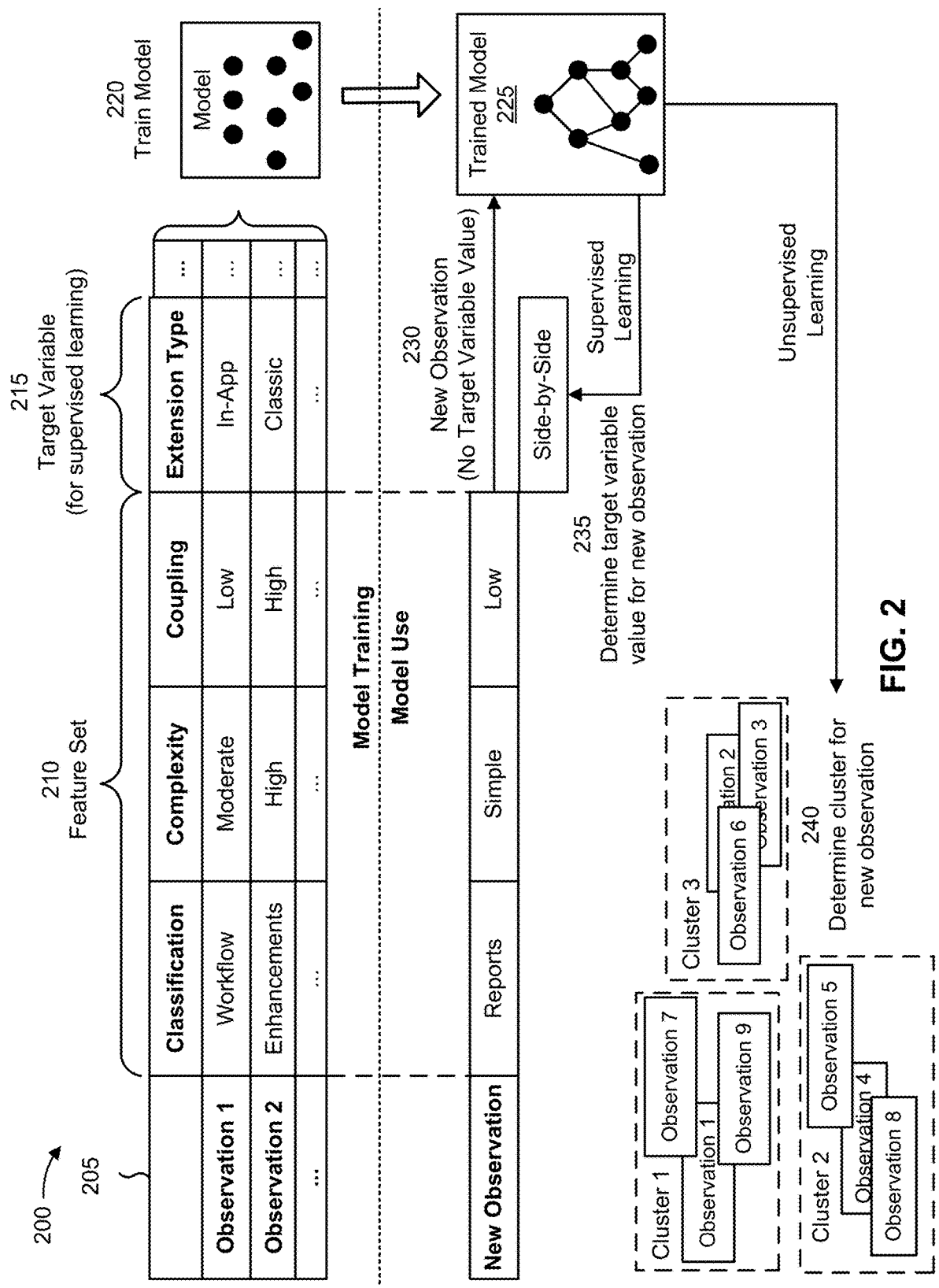
FIG. 2 is a diagram illustrating an example of training and using a machine learning model in connection with an extensibility recommendation system for custom code objects.

FIG. 2 is a diagram illustrating an example 200 of training and using a machine learning model in connection with extensibility recommendations for custom code objects. The machine learning model training and usage described herein may be performed using a machine learning system. The machine learning system may include or may be included in a computing device, a server, a cloud computing environment, or the like, such as the extensibility recommendation system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the extensibility recommendation system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the extensibility recommendation system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of classification, a second feature of complexity, a third feature of coupling, and so on. As shown, for a first observation, the first feature may have a value of workflow, the second feature may have a value of moderate, the third feature may have a value of low, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is extension type, which has a value of in-app for the first observation.

The feature set and target variable described above are provided as examples, and other examples may differ from what is described above. For example, for a target variable of classification or complexity, the feature set may include a quantity of custom tables, a quantity of standard tables, a quantity of drill-down operations, a quantity of select queries, a quantity of CRUD operations, a quantity of standard or custom function modules, a quantity of RFC calls, and/or a quantity of ALV calls, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on previous assessments of custom code objects by the extensibility recommendation system.

As shown by reference number 230, the machine learning system may apply the trained machine learning model 225 to a new observation, such as by receiving a new observation and inputting the new observation to the trained machine learning model 225. As shown, the new observation may include a first feature classifying a custom code object as a report, a second feature indicating a simple complexity for the custom code object, a third feature indicating a low coupling for the custom code object, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of side-by-side for the target variable of extension type for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, deploying the custom code object in a target environment using a side-by-side extension type. The first automated action may include, for example, estimating an effort to develop the custom code object for deployment using the side-by-side extension type and/or determining a recommended solution approach for developing the custom code object for a target environment (e.g., whether to use an ABAP PaaS technique or a CAP model to develop the custom code object using the side-by-side extension type).

As another example, if the machine learning system were to predict a value of in-app for the target variable of extension type, then the machine learning system may provide a second (e.g., different) recommendation (e.g., using an in-app extension type in which the custom code object remains in the source environment) and/or may perform or cause performance of a second (e.g., different) automated action (e.g., determining one or more in-app tools that may be available to use to develop the custom code object).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., side-by-side extensions), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., in-app extensions), then the machine learning system may provide a second (e.g., different) recommendation (e.g., the second recommendation described above) and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine a recommended extension type for a custom code object, determine a category in which to classify a custom code object, determine a complexity of a custom code object, and/or estimate an effort to migrate a custom code object to a target environment, among other examples. The machine learning system enables recognition and/or identification of tens, hundreds, thousands, or millions of features and/or feature values for tens, hundreds, thousands, or millions of observations, thereby increasing accuracy and consistency and reducing delay associated with making extensibility recommendations for custom code objects relative to requiring computing resources to be allocated for tens, hundreds, or thousands of operators to manually assess custom code objects for migration using the features or feature values.

As indicated above, FIG. 2 is provided as an example. Other examples may differ from what is described in connection with FIG. 2.

Figure 3:
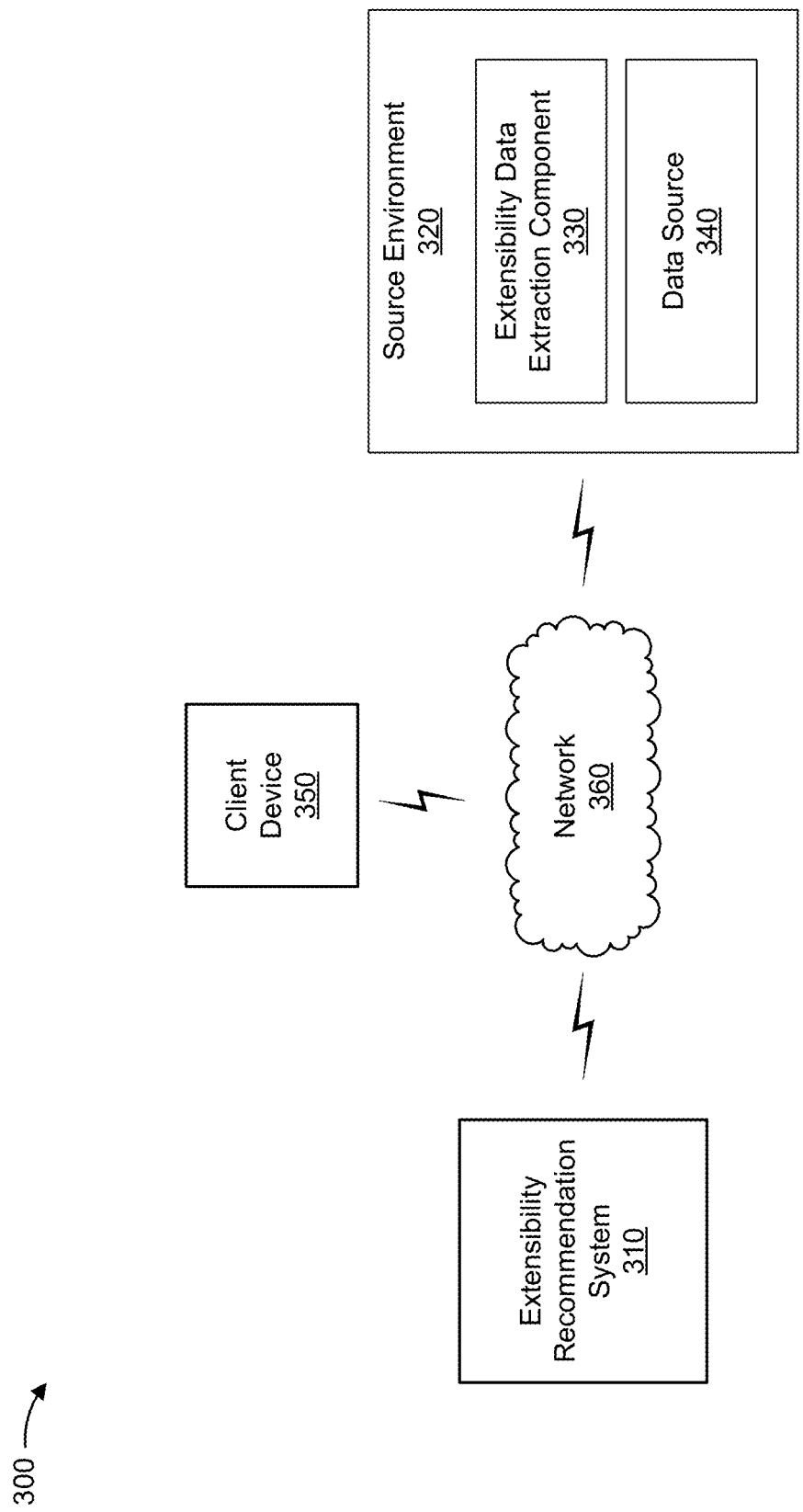
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an extensibility recommendation system 310, a source environment 320, an extensibility data extraction component 330 running in the source environment 320, a data source 340 included in the source environment 320, a client device 350, and/or a network 360. Devices of environment 300 may interconnect via wired connections, wireless connections, or a combination of wired and wireless connections.

The extensibility recommendation system 310 includes one or more devices capable of receiving, generating, storing, processing, providing, and/or routing information associated with extensibility recommendations for custom code objects (e.g., custom code objects installed in the source environment 320), as described elsewhere herein. The extensibility recommendation system 310 may include a communication device and/or a computing device. For example, the extensibility recommendation system 310 may include a server, such as an application server, a client server, a web server, a database server, a host server, a proxy server, a virtual server (e.g., executing on computing hardware), or a server in a cloud computing system. In some implementations, the extensibility recommendation system 310 includes computing hardware used in a cloud computing environment.

The source environment 320 includes one or more devices capable of receiving, generating, storing, processing, providing, and/or routing information associated with one or more custom code objects to be assessed for migration to a target environment, as described elsewhere herein. The source environment 320 may include a communication device and/or a computing device. For example, the source environment 320 may include a server, such as an application server, a client server, a web server, a database server, a host server, a proxy server, a virtual server (e.g., executing on computing hardware), or a server in a cloud computing system. In some implementations, the source environment 320 includes computing hardware used in a cloud computing environment. In some implementations, the source environment 320 may be included in an environment that includes runtime computing resources (e.g., processing resources, memory resources, and/or storage resources, among other examples) and/or interfaces between computing resources to execute an extensible software system and one or more custom code objects that were developed for the extensible software system. For example, in some implementations, the runtime computing resources may be provided in a sandbox environment or an environment that is a most recent copy of a production environment.

Furthermore, in some implementations, the runtime computing resources may be used to execute the extensibility data extraction component 330, which may include one or more devices capable of receiving, generating, storing, processing, providing, and/or routing information associated with one or more custom code objects running in the source environment 320. For example, in some implementations, the extensibility data extraction component 330 may obtain information related to the custom code objects from the data source 340, which includes one or more devices capable of receiving, generating, storing, processing, and/or providing information associated with the one or more custom code objects running in the source environment 320, as described elsewhere herein. The data source 340 may include a communication device and/or a computing device. For example, the data source 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 340 may communicate with one or more other devices of environment 300, as described elsewhere herein.

The client device 350 includes one or more devices capable of receiving, generating, storing, processing, and/or providing information associated with extensibility recommendations for custom code objects (e.g., custom code objects installed in the source environment 320), as described elsewhere herein. The client device 350 may include a communication device and/or a computing device. For example, the client device 350 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 360 includes one or more wired and/or wireless networks. For example, the network 360 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 360 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
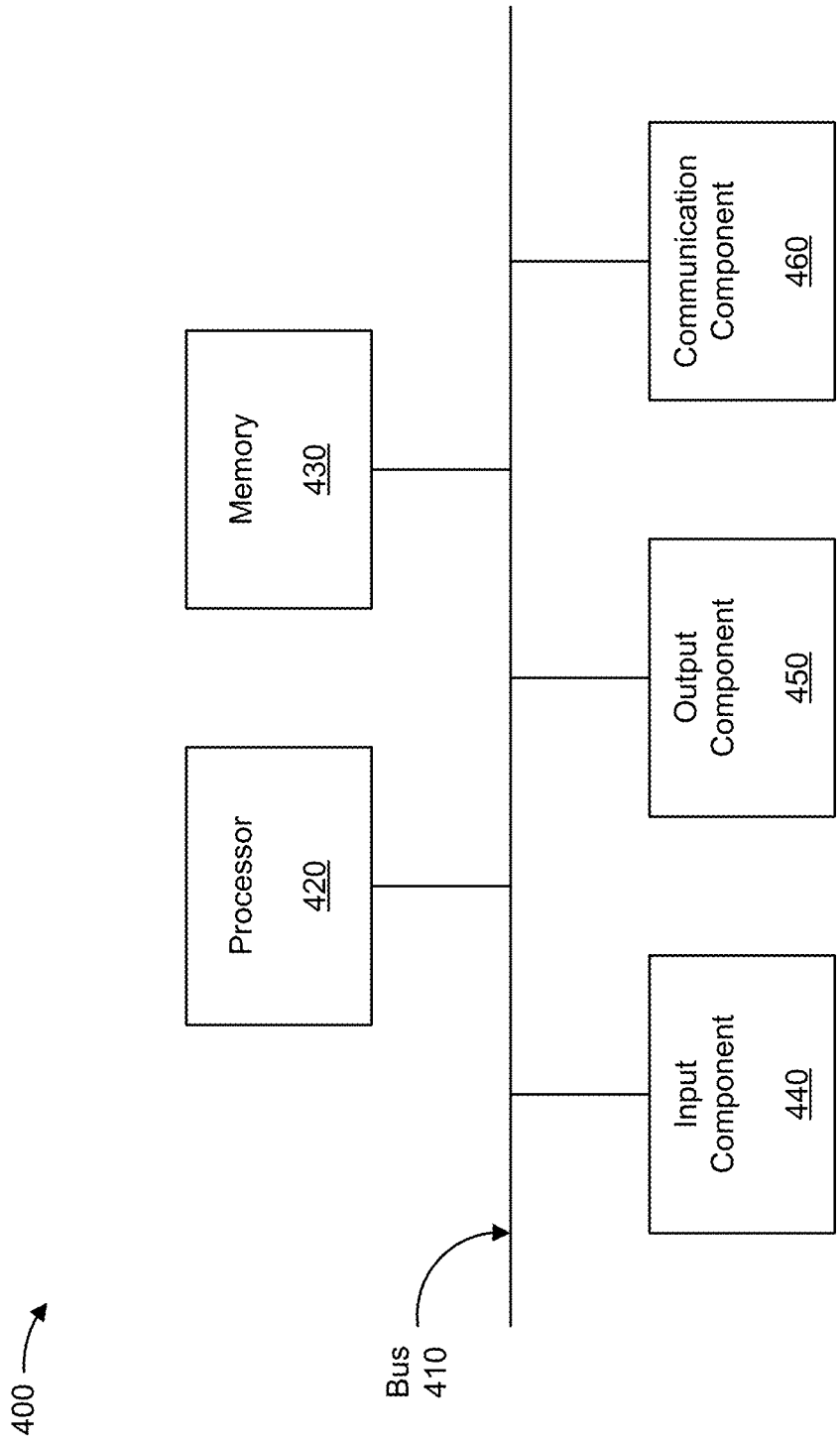
FIG. 4 is a diagram of example components of one or more devices of FIG. 3.

FIG. 4 is a diagram of example components of a device 400, which may correspond to extensibility recommendation system 310, extensibility data extraction component 330, data source 340, and/or client device 350. In some implementations, extensibility recommendation system 310, extensibility data extraction component 330, data source 340, and/or client device 350 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
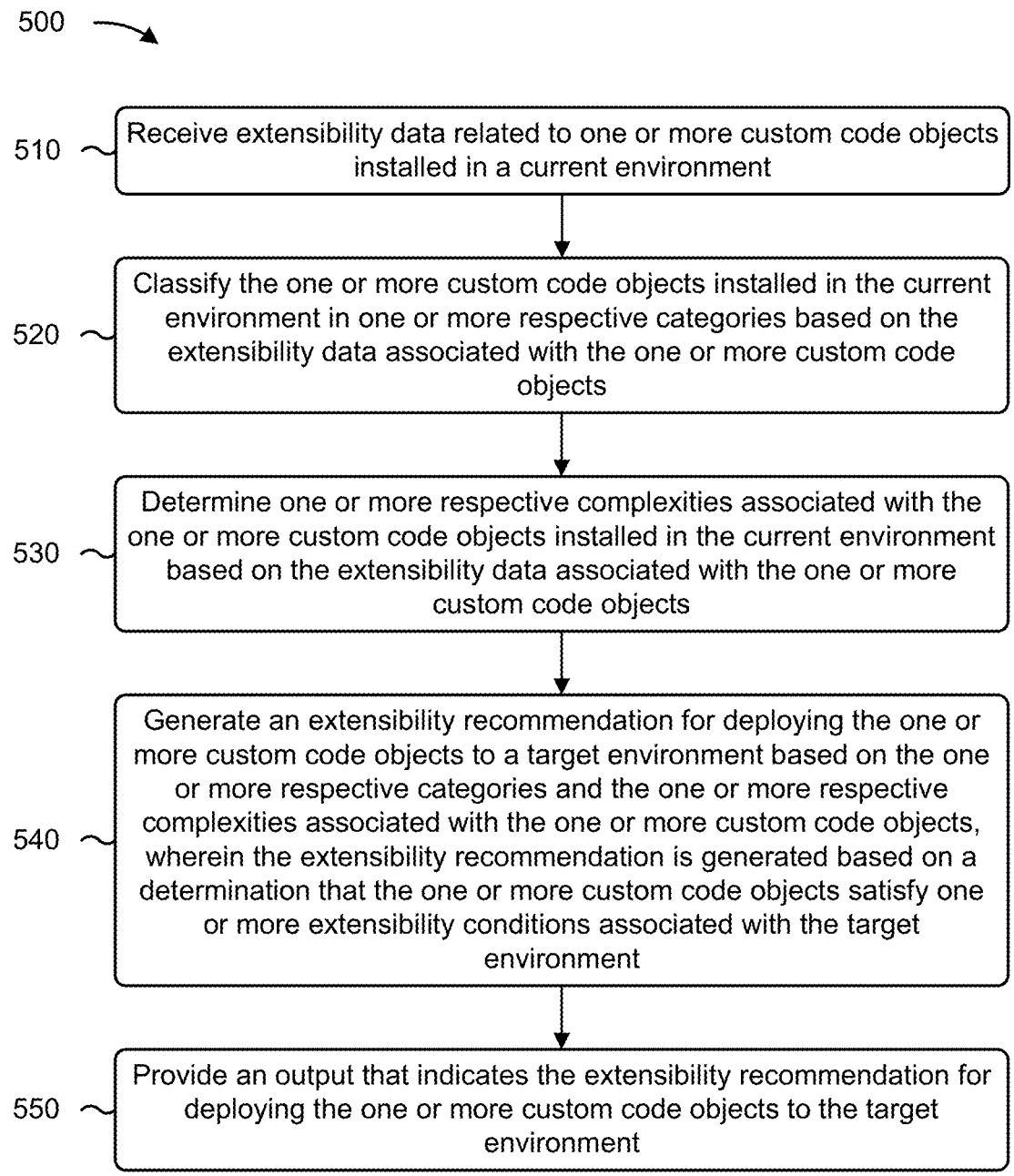
FIG. 5 is a flowchart of an example process relating to an extensibility recommendation system for custom code objects.

FIG. 5 is a flowchart of an example process 500 associated with an extensibility recommendation system for custom code objects. In some implementations, one or more process blocks of FIG. 5 are performed by an extensibility recommendation system (e.g., extensibility recommendation system 310). In some implementations, one or more process blocks of FIG. 5 are performed by another device or a group of devices separate from or including the extensibility recommendation system, such as a source environment (e.g., source environment 320), an extensibility data extraction component (e.g., extensibility data extraction component 330), and/or a client device (e.g., client device 350). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving extensibility data related to one or more custom code objects installed in a current environment (block 510). For example, the extensibility recommendation system may receive extensibility data related to one or more custom code objects installed in a current environment, as described above.

As further shown in FIG. 5, process 500 may include classifying the one or more custom code objects installed in the current environment in one or more respective categories based on the extensibility data associated with the one or more custom code objects (block 520). For example, the extensibility recommendation system may classify the one or more custom code objects installed in the current environment in one or more respective categories based on the extensibility data associated with the one or more custom code objects, as described above.

As further shown in FIG. 5, process 500 may include determining one or more respective complexities associated with the one or more custom code objects installed in the current environment based on the extensibility data associated with the one or more custom code objects (block 530). For example, the extensibility recommendation system may determine one or more respective complexities associated with the one or more custom code objects installed in the current environment based on the extensibility data associated with the one or more custom code objects, as described above.

As further shown in FIG. 5, process 500 may include generating an extensibility recommendation for deploying the one or more custom code objects to a target environment based on the one or more respective categories and the one or more respective complexities associated with the one or more custom code objects, wherein the extensibility recommendation is generated based on a determination that the one or more custom code objects satisfy one or more extensibility conditions associated with the target environment (block 540). For example, the extensibility recommendation system may generate an extensibility recommendation for deploying the one or more custom code objects to a target environment based on the one or more respective categories and the one or more respective complexities associated with the one or more custom code objects, as described above. In some implementations, the extensibility recommendation is generated based on a determination that the one or more custom code objects satisfy one or more extensibility conditions associated with the target environment.

As further shown in FIG. 5, process 500 may include providing an output that indicates the extensibility recommendation for deploying the one or more custom code objects to the target environment (block 550). For example, the extensibility recommendation system may provide an output that indicates the extensibility recommendation for deploying the one or more custom code objects to the target environment, as described above.

Process 500 may include additional implementations, such as any single implementation or any combination of implementations described below and/or in connection with one or more other processes described elsewhere herein.

In a first implementation, the extensibility data related to the one or more custom code objects is received from a data extraction utility that is installed in the current environment and configured to scan the one or more custom code objects.

In a second implementation, alone or in combination with the first implementation, the extensibility data received from the data extraction utility includes, for each of the one or more custom code objects, one or more metadata fields that describe the custom code object and one or more metadata fields that describe category-specific tokens associated with the custom code object, parameters related to a complexity associated with the custom code object, or parameters related to an extensibility associated with the custom code object.

In a third implementation, alone or in combination with one or more of the first and second implementations, the extensibility data received from the data extraction utility includes usage data related to one or more of a frequency or a volume of use for each custom code object, and the extensibility recommendation is based on the usage data.

In a fourth implementation, alone or in combination with one or more of the first through third implementations, the extensibility data received from the data extraction utility includes clone analytics related to each custom code object that has been cloned from a standard object, and the extensibility recommendation is based on the clone analytics.

In a fifth implementation, alone or in combination with one or more of the first through fourth implementations, process 500 includes receiving questionnaire responses related to the one or more custom code objects installed in the current environment, and providing the questionnaire responses to a machine learning model that is trained to predict the extensibility data related to the one or more custom code objects using historical extensibility recommendations and historical extensibility data, wherein the extensibility data related to the one or more custom code objects is received from the machine learning model.

In a sixth implementation, alone or in combination with one or more of the first through fifth implementations, process 500 includes providing, to a machine learning system, training data that includes historical extensibility recommendations and historical extensibility data, determining that the extensibility recommendation for deploying the one or more custom code objects to the target environment relates to a scenario that is not represented in the training data provided to the machine learning system, and performing, based on information related to the scenario, an incremental learning process to update a machine learning model that was trained using the training data.

In a seventh implementation, alone or in combination with one or more of the first through sixth implementations, process 500 includes providing the extensibility data associated with the one or more custom code objects to a machine learning system configured to provide an output that includes enrichment data associated with the extensibility recommendation, and optimizing, based on the enrichment data, the output that indicates the extensibility recommendation for deploying the one or more custom code objects to the target environment.

In an eighth implementation, alone or in combination with one or more of the first through seventh implementations, the output that indicates the extensibility recommendation for deploying the one or more custom code objects includes information related to a standard fitment, a standardization feasibility, an estimated effort, or a recommended solution approach for deploying the one or more custom code objects to the target environment.

In a ninth implementation, alone or in combination with one or more of the first through eighth implementations, the extensibility recommendation indicates a side-by-side extensibility, an in-app extensibility, a classic extensibility, or a hyperscaler extensibility for the one or more custom code objects that satisfy the one or more extensibility conditions.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, extensibility data related to one or more custom code objects installed in a current environment,
        wherein the extensibility data includes information associated with a list of the one or more custom code objects, and
        wherein the one or more custom code objects are cloned from standard objects associated with a software system related to the current environment;
    classifying, by the device, the one or more custom code objects installed in the current environment in one or more respective categories based on the extensibility data associated with the one or more custom code objects;
    determining, by the device, one or more respective complexities associated with the one or more custom code objects installed in the current environment based on the extensibility data associated with the one or more custom code objects;
    generating, by the device, an extensibility recommendation for deploying the one or more custom code objects to a target environment based on the one or more respective categories and the one or more respective complexities associated with the one or more custom code objects,
        wherein the extensibility recommendation is generated based on a determination that the one or more custom code objects satisfy one or more extensibility conditions associated with the target environment; and
    providing, by the device, an output that indicates the extensibility recommendation for deploying the one or more custom code objects to the target environment.

2. The method of claim 1, wherein the extensibility data related to the one or more custom code objects is received from a data extraction utility that is installed in the current environment and configured to scan the one or more custom code objects.

3. The method of claim 2, wherein the extensibility data received from the data extraction utility includes, for each of the one or more custom code objects, one or more metadata fields that describe the custom code object and one or more metadata fields that describe:
    category-specific tokens associated with the custom code object,
    parameters related to a complexity associated with the custom code object, or
    parameters related to an extensibility associated with the custom code object.

4. The method of claim 2, wherein the extensibility data received from the data extraction utility includes usage data related to one or more of a frequency or a volume of use for each custom code object, and wherein the extensibility recommendation is based on the usage data.

5. The method of claim 2, wherein the extensibility data received from the data extraction utility includes clone analytics related to each custom code object that has been cloned from a standard object, and wherein the extensibility recommendation is based on the clone analytics.

6. The method of claim 1, further comprising:
receiving questionnaire responses related to the one or more custom code objects installed in the current environment; and
providing the questionnaire responses to a machine learning model that is trained to predict the extensibility data related to the one or more custom code objects using historical extensibility recommendations and historical extensibility data, wherein the extensibility data related to the one or more custom code objects is received from the machine learning model.

7. The method of claim 1, further comprising:
providing, to a machine learning system, training data that includes historical extensibility recommendations and historical extensibility data;
determining that the extensibility recommendation for deploying the one or more custom code objects to the target environment relates to a scenario that is not represented in the training data provided to the machine learning system; and
performing, based on information related to the scenario, an incremental learning process to update a machine learning model that was trained using the training data.

8. The method of claim 1, further comprising:
providing the extensibility data associated with the one or more custom code objects to a machine learning system configured to provide an output that includes enrichment data associated with the extensibility recommendation; and
optimizing, based on the enrichment data, the output that indicates the extensibility recommendation for deploying the one or more custom code objects to the target environment.

9. The method of claim 1, wherein the output that indicates the extensibility recommendation for deploying the one or more custom code objects includes information related to a standard fitment, a standardization feasibility, an estimated effort, or a recommended solution approach for deploying the one or more custom code objects to the target environment.

10. The method of claim 1, wherein the extensibility recommendation indicates a side-by-side extensibility, an in-app extensibility, a classic extensibility, or a hyperscaler extensibility for the one or more custom code objects that satisfy the one or more extensibility conditions.

11. A device, comprising:
one or more memories; and
one or more processors, coupled to the one or more memories, configured to:
deploy, to a current environment, a data extraction utility configured to scan one or more custom code objects installed in the current environment;
receive, from the data extraction utility, extensibility data related to the one or more custom code objects installed in the current environment,
wherein the extensibility data includes information associated with a list of the one or more custom code objects,
wherein the one or more custom code objects are cloned from standard objects associated with a software system related to the current environment,
wherein the extensibility data further includes, for each of the one or more custom code objects, one or more metadata fields that describe the custom code object and one or more metadata fields that describe one or more of:
category-specific tokens associated with the custom code object,
parameters related to a complexity associated with the custom code object, or
parameters related to an extensibility associated with the custom code object;
determine one or more respective categories and one or more respective complexities associated with the one or more custom code objects installed in the current environment based on the extensibility data;
generate an extensibility recommendation for deploying the one or more custom code objects to a target environment based on the one or more respective categories and the one or more respective complexities associated with the one or more custom code objects,
wherein the extensibility recommendation is generated based on the one or more custom code objects satisfying one or more extensibility conditions associated with the target environment; and
provide an output that indicates the extensibility recommendation, of the one or more extensibility conditions, for deploying the one or more custom code objects to the target environment.

12. The device of claim 11, wherein the extensibility data received from the data extraction utility includes usage data related to one or more of a frequency or a volume of use for each custom code object, and wherein the extensibility recommendation is based on the usage data.

13. The device of claim 11, wherein the extensibility data received from the data extraction utility includes clone analytics related to each custom code object that has been cloned from a standard object, and wherein the extensibility recommendation is based on the clone analytics.

14. The device of claim 11, wherein the one or more processors are further configured to:
provide, to a machine learning system, training data that includes historical extensibility recommendations and historical extensibility data;
determine that the extensibility recommendation for deploying the one or more custom code objects to the target environment relates to a scenario that is not represented in the training data provided to the machine learning system; and
perform, based on information related to the scenario, an incremental learning process to update a machine learning model that was trained using the training data.

15. The device of claim 11, wherein the one or more processors are further configured to:
provide the extensibility data associated with the one or more custom code objects to a machine learning system configured to provide an output that includes enrichment data associated with the extensibility recommendation; and
optimize, based on the enrichment data, the output that indicates the extensibility recommendation for deploying the one or more custom code objects to the target environment.

16. A non-transitory computer-readable medium storing a set of instructions, the set of instructions comprising:
one or more instructions that, when executed by one or more processors of a device, cause the device to:
receive extensibility data related to one or more custom code objects installed in a current environment,
wherein the extensibility data includes information associated with the one or more custom code objects, and
wherein the one or more custom code objects are cloned from standard objects associated with a software system related to the current environment;
generate an extensibility recommendation for deploying the one or more custom code objects to a target environment based on one or more respective categories and one or more respective complexities that are associated with the one or more custom code objects based on the extensibility data; and
provide an output that indicates the extensibility recommendation for deploying the one or more custom code objects to the target environment based on the one or more custom code objects satisfying one or more extensibility conditions associated with the target environment,
wherein the output that indicates the extensibility recommendation for deploying the one or more custom code objects includes information related to a standard fitment, a standardization feasibility, an estimated effort, or a recommended solution approach for deploying the one or more custom code objects to the target environment, and
wherein the extensibility recommendation indicates a side-by-side extensibility, an in-app extensibility, a classic extensibility, or a hyperscaler extensibility for the one or more custom code objects that satisfy the one or more extensibility conditions.

17. The non-transitory computer-readable medium of claim 16, wherein the extensibility data related to the one or more custom code objects is received from a data extraction utility that is installed in the current environment and configured to scan the one or more custom code objects.

18. The non-transitory computer-readable medium of claim 16, wherein the one or more instructions further cause the device to:
receive questionnaire responses related to the one or more custom code objects installed in the current environment; and
provide the questionnaire responses to a machine learning model that is trained to predict the extensibility data related to the one or more custom code objects using historical extensibility recommendations and historical extensibility data, wherein the extensibility data related to the one or more custom code objects is received from the machine learning model.

19. The non-transitory computer-readable medium of claim 16, wherein the one or more instructions further cause the device to:
provide, to a machine learning system, training data that includes historical extensibility recommendations and historical extensibility data;
determine that the extensibility recommendation for deploying the one or more custom code objects to the target environment relates to a scenario that is not represented in the training data provided to the machine learning system; and
perform, based on information related to the scenario, an incremental learning process to update a machine learning model that was trained using the training data.

20. The non-transitory computer-readable medium of claim 16, wherein the one or more instructions further cause the device to:
provide the extensibility data associated with the one or more custom code objects to a machine learning system configured to provide an output that includes enrichment data associated with the extensibility recommendation; and
optimize, based on the enrichment data, the output that indicates the extensibility recommendation for deploying the one or more custom code objects to the target environment.

* * * * *